(12) United States Patent
Salomon et al.

(10) Patent No.: US 10,330,132 B2
(45) Date of Patent: Jun. 25, 2019

(54) FLOW-CONDUCTING COMPONENT

(71) Applicant: KSB Aktiengesellschaft, Frankenthal (DE)

(72) Inventors: Kai Salomon, Frankenthal (DE); Bjoern Will, Frankenthal (DE)

(73) Assignee: KSB Aktiengesellschaft, Frankenthal (DE)

( * ) Notice: Subject to any disclaimer, the term of this patent is extended or adjusted under 35 U.S.C. 154(b) by 187 days.

(21) Appl. No.: 15/513,884

(22) PCT Filed: Sep. 22, 2015

(86) PCT No.: PCT/EP2015/071672
§ 371 (c)(1),
(2) Date: Mar. 23, 2017

(87) PCT Pub. No.: WO2016/046174
PCT Pub. Date: Mar. 31, 2016

(65) Prior Publication Data
US 2017/0284430 A1    Oct. 5, 2017

(30) Foreign Application Priority Data
Sep. 26, 2014    (DE) .......................... 10 2014 219 557

(51) Int. Cl.
*F15D 1/04*    (2006.01)
*F15D 1/14*    (2006.01)
(Continued)

(52) U.S. Cl.
CPC ................. *F15D 1/04* (2013.01); *F15D 1/14* (2013.01); *F16L 43/00* (2013.01); *A47G 21/18* (2013.01)

(58) Field of Classification Search
CPC ... A47G 21/18; F04D 29/026; F04D 29/2222; F04D 29/2227; F04D 29/245;
(Continued)

(56) References Cited

U.S. PATENT DOCUMENTS

2017/0218969 A1* 8/2017 Boehm ................. F04D 29/026
2017/0284430 A1* 10/2017 Salomon .................. F15D 1/04

FOREIGN PATENT DOCUMENTS

DE    10 2011 080 345 A1    2/2013
GB              486991           6/1938
(Continued)

OTHER PUBLICATIONS

International Preliminary Report on Patentability (PCT/IB/338 & PCT/IB/373) issued in PCT Application No. PCT/EP2015/071672 dated Apr. 6, 2017, including English translation of document C2 (German-language Written Opinion (PCT/ISA/237)) previously filed on Mar. 23, 2017 (9 pages).
(Continued)

*Primary Examiner* — Yaritza Guadalupe-McCall
(74) *Attorney, Agent, or Firm* — Crowell & Moring LLP

(57) ABSTRACT

A method for geometrically designing a flow-conducting component, and a corresponding flow-conducting component, are provided. The flow-conducting includes a flow direction-changing surface arranged to change the direction of a flow by a certain angle from an inflow direction in a first section to an outflow direction in a second section, the flow direction-changing surface being formed corresponding to a contour of line segments having formed based on dependent triangulation between a bisector of the certain angle and sides of the first and/or second sections.

12 Claims, 2 Drawing Sheets

(51) Int. Cl.
*F16L 43/00* (2006.01)
*A47G 21/18* (2006.01)

(58) Field of Classification Search
CPC .. F04D 29/28; F05D 2230/30; F05D 2300/11; F15D 1/04; F15D 1/14; F16L 43/00
USPC .......................................................... 33/1 N
See application file for complete search history.

(56) References Cited

FOREIGN PATENT DOCUMENTS

| WO | WO 97/19286 A2 | 5/1997 |
| WO | WO 98/15483 A1 | 4/1998 |
| WO | WO 2013/017308 A2 | 2/2013 |

OTHER PUBLICATIONS

International Search Report (PCT/ISA/210) issued in PCT Application No. PCT/EP2015/071672 dated Jan. 5, 2016 with English translation (seven pages).
German-language Written Opinion (PCT/ISA/237) issued in PCT Application No. PCT/EP2015/071672 dated Jan. 5, 2016 (six pages).
German Office Action issued in counterpart German Application No. 10 2014 219 557.8 dated Jun. 2, 2016 (six pages).

* cited by examiner

FLOW-CONDUCTING COMPONENT

CROSS REFERENCE TO RELATED APPLICATIONS

This application is a National Stage of PCT International Application No. PCT/EP2015/071672, filed Sep. 22, 2015, which claims priority under 35 U.S.C. § 119 from German Patent Application No. 10 2014 219 557.8, filed Sep. 26, 2014, the entire disclosures of which are herein expressly incorporated by reference.

The invention relates to a flow-guiding component and a method for manufacturing a flow-guiding component.

Various embodiments of flow-guiding components are known. The component is produced from special materials according to the conditions of use, i.e. working pressure, medium being conveyed, media temperature or similar. The static structure of the housing is likewise strongly dependent on the area of use.

The present invention relates to the geometric configuration of a flow-guiding component, in particular the geometric configuration of a region in which a change of direction of the flow is effected.

A so-called tube angle fitting, a tube elbow or a tube bend is a simple type of flow-guiding component, through which a change of direction of the flow is brought about. Such a bend can selectively change the direction of a flow in a tube, the bend being mostly manufactured as a circular arc section from a tube piece which, for a circle radius r, effects a deflection of the flow by the center angle α.

In deviation from the circular arc section, it is suggested by WO 2013 017 308 A2 or GB 486 991 A, for example, that the angle fitting is provided with an explicit inlet and an outlet, that is to say the symmetry of the tube piece with regard to the flow direction is broken.

WO 2013 017 308 A2 teaches using an angle fitting with a continuous radius profile for the change of direction of a flow, in order to likewise continuously change the acting forces and not provide any abrupt changes of direction. The manufacture of this flow-guiding component is very complicated, however.

The object of the invention is to provide a method for forming the geometric configuration of a flow-guiding component which effects an energy-saving change of direction by an angle in a flow and is simple to manufacture.

This object is achieved by constructing a contour with the aid of triangles, wherein, in a first step, the flow direction of the flow in the component is established, in a second step, the angle bisector of the angle is determined, with a point being defined along this angle bisector and in each case a perpendicular from one of the regions which form the angle being dropped through the point, wherein, in a third step, a straight line is taken through the point at a second angle of 45° to the respective perpendicular, a segment being established in each case by the intersection of these straight lines with the respective regions, the respective centers of which segments establish second points, wherein, in a fourth step, a straight line is taken to the second point situated in the established flow direction at a third angle of 22.5° to the segment, said straight line intersecting the region at a third point, wherein, in a fifth step, a straight line is taken to the third point at a fourth angle of 12.25° to the segment, said straight line intersecting the regions in the flow direction at a point, wherein the envelope of this construction defines the geometric configuration of the geometric contour.

It is advantageous in this case that the construction can be determined by simple means. Equally, the simple forms can be realized in a specific product with little effort. The processing of a component manufactured according to this method is very uncomplicated due to the simple contour, since the curve is composed of just a few straight sections.

The contour offers the advantage that wherever separation zones form as a result of differences in the flow velocity in the region of the change of direction in a classical tube angle fitting, designed as a bend or an elbow, the geometry is altered in such a manner that the flow losses are reduced.

In a further configuration of the method according to the invention, the contour is constructed in a symmetrical manner. The construction presented above provides a connection in series of the triangles, one behind the other, in the flow direction. This can also be extended in a symmetrical manner, that is to say in addition counter to the flow direction. The component can then be flowed through in both directions with the same advantages.

The invention further describes a flow-guiding component, the geometry of which is constructed according to the described method. With this component it is possible to provide in a simple advantageous manner the change of direction of the flow velocity, for example as a tube angle fitting, that is to say as a 90° bend in a tube, which can be constructed and manufactured in a simple manner.

It is particularly advantageous if vanes are additionally arranged in the flow. These vanes, also referred to as fixtures, are for example simple baffles, which are aligned in the flow direction and thereby offer little resistance. They improve the flow in an angle fitting significantly. The vanes disrupt the crossflows, which arise on account of the velocity differences in the tube, and thus reduce the losses. The geometry of the vane is based on the method according to the invention for the construction of the angle fitting.

Other objects, advantages and novel features of the present invention will become apparent from the following detailed description of one or more preferred embodiments when considered in conjunction with the accompanying drawings.

DETAILED DESCRIPTION

Figure 1:
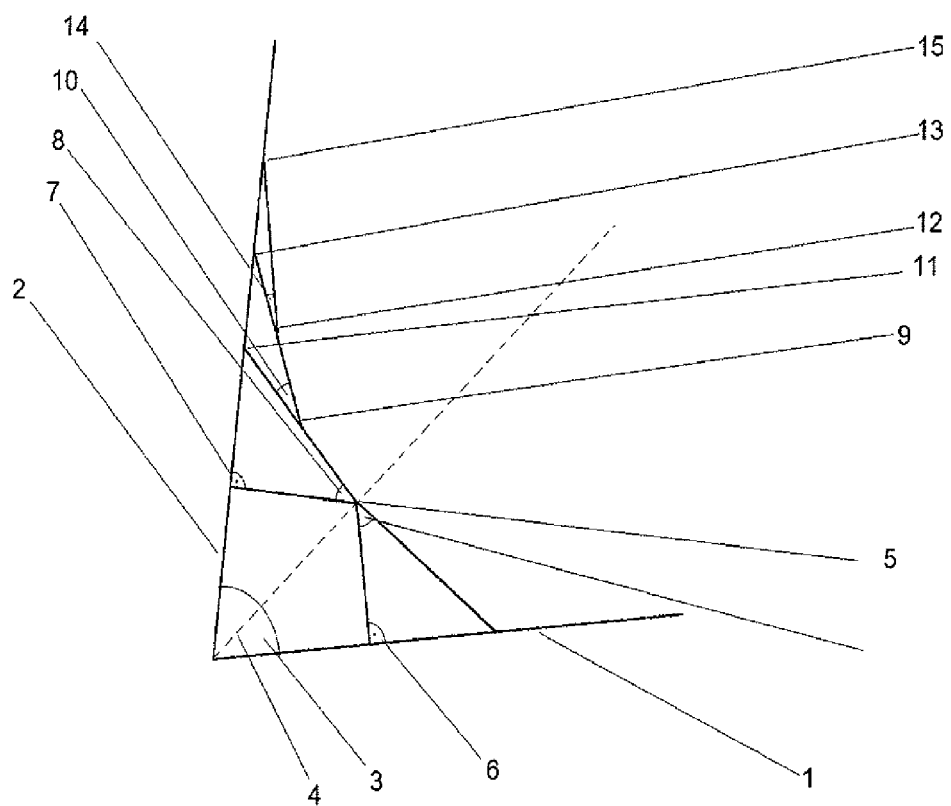
FIG. 1 shows the construction method in accordance with an embodiment of the present invention at an arbitrary angle fitting.

FIG. 1 shows an arbitrary point at which the contour of a component transitions in a discontinuous manner from a first region 1 into a second region 2, wherein the two regions enclose an angle 3. At this point of discontinuity, substantial disturbances develop in the flow path, disturbances which can be strongly influenced by a suitably constructed geometric profile. Traditionally here, a so-called tube bend or a tube elbow is provided, which either provides a rounding with a selected radius or a sharp angle.

Based on various observations in nature, a method for forming the bend can be developed, said method being simple to construct and nevertheless influencing the flow conditions at the point of discontinuity in such a manner that the losses in the bend can be very greatly reduced with a minimum expenditure on construction and production. To this end, the angle bisector 4 of the angle 3 is constructed. A point 5 is selected on this angle bisector. Through this point 5, the straight lines 6 and 7 are taken perpendicularly to the regions 1 and 2. At point 5, straight lines which intersect regions 1 and 2, with the intersection point 11 being established in region 2, are taken at the angle 8 of 45° to these straight lines 6 and 7. The segment between the point 5 and the point 11 is bisected, yielding the point 9, at which a straight line is taken at the angle 10 of 22.5°, said line intersecting the region 2 at the point 13. The segment between the point 9 and the point 13 is again bisected, yielding the point 12, at which a straight line is taken at the angle 14 of 12.2°, said line intersecting the region 2 at the point 15. The envelope of this construction results in a contour.

The construction presented is based on an asymmetric loading of a component. If the component were loaded in a symmetrical manner, for example as a result of an alternating forward/return flow, then it would be possible to complement the construction in a symmetrical manner in the direction of the first region 1 in an analogous way.

Figure 2:
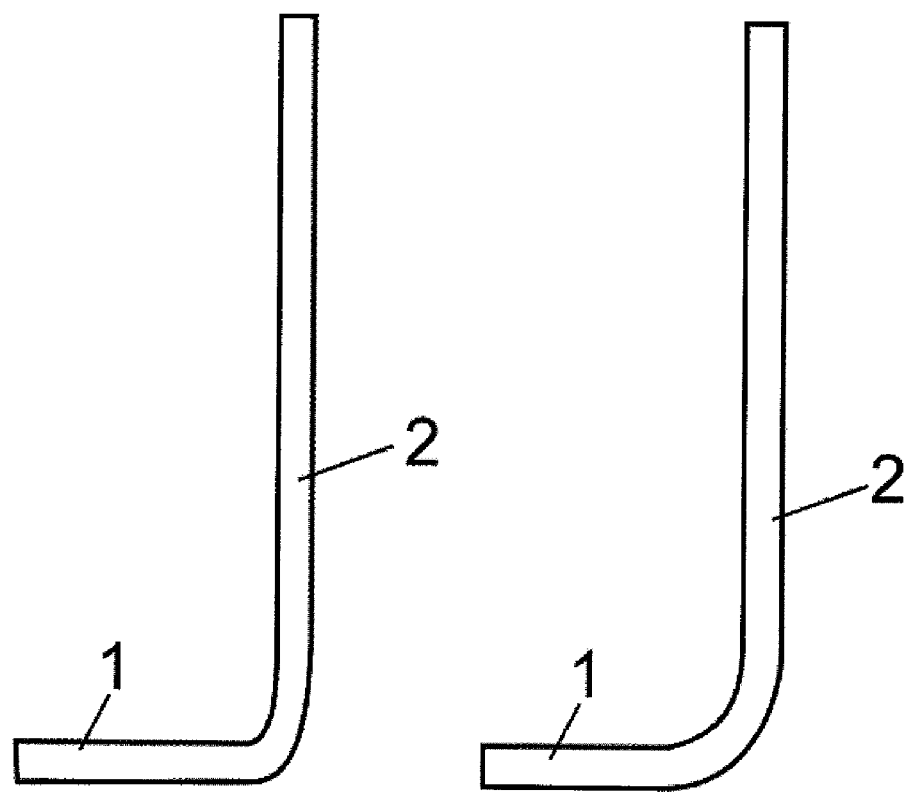
FIG. 2 shows a comparison between a conventional angle fitting and an angle fitting according to an embodiment of the present invention.

FIG. 2 shows a direct comparison between an angle fitting having a conventional radius (right) and an angle fitting having a profile according to the invention (left). On account of its asymmetry, the profile according to the invention is to be installed in a fixed manner in one direction, to be specific such that the flow direction points from a first region 1 to a second region 2. In a direct comparison, the significantly smaller dimensions of the angle fitting according to the invention are noticeable. The simple construction according to the invention saves not only energy in deflecting the flow, but also installation space and material during the production of the angle fitting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF DESIGNATIONS

1 First region
2 Second region
3 Angle of change of direction
4 Angle bisector
5 Point
6 Right angle
7 Right angle
8 Angle of 45°
9 Point
10 Angle of 22.5°
11 Intersection point
12 Point
13 Intersection point
14 Angle of 12.25°
15 Intersection point

The invention claimed is:
1. A method for the geometric configuration of a flow-guiding component, wherein the flow-guiding component effects a change of direction of a flow with a first angle from a second region to a first region, the flow in the first region having an inflowing direction and in the second region having an outflowing direction, comprising the acts of:
identifying on a bisector of the first angle at a point of intersection of a second line perpendicular to a second region line defining a second side of the first angle with a first line perpendicular to a first region line defining a first side of the first angle;
identifying a mid-point of a third line, the third line extending at a second angle between the point of intersection and the second region line on a side of the second perpendicular line away from an origin point of the first angle;
identifying a mid-point of a fourth line, the fourth line line extending at a third angle between the mid-point of the third line to the second region line on a side of the third line away from the origin point of the first angle;
identifying a mid-point of a fifth line, the fifth line extending at a fourth angle between the mid-point of the fourth line to the second region line on a side of the fourth line away from the origin point of the first angle; and
constructing the flow-guiding component with a flow direction-changing surface corresponding to a contour of line segments from the point of intersection of the first and second perpendicular lines to the mid-point of the third line, thence to the mid-point of the fourth line, thence to the mid-point of the fifth line and thence to the second region line.
2. The method as claimed in claim 1, wherein
the flow-guiding component is produced with a contour on the first side of the first angle symmetrical to the contour on the second side of the first angle.
3. The method as claimed in claim 1, wherein
the flow-guiding component is constructed with the contour on the second side of the first angle being asymmetrical to a contour of the flow-guiding component on the first side of the first angle.
4. The method as claimed in claim 1, wherein
the second angle is 45°,
the third angle is 22.5°, and
the fourth angle is 12.25°.
5. A flow-guiding component, comprising:
a flow direction-changing surface configured to change a flow direction of a flow over a first angle between a first region in an inflowing direction and a second region in an outflowing direction,
wherein
the flow direction-changing surface is constructed along a contour of line segments, and
the contour of line segments is defined by serial connection of
a first line segment extending between
a point of intersection on a bisector of the first angle, the point of intersection being defined by intersection of a second line perpendicular to a second region line defining a second side of the first angle with a first line perpendicular to a first region line defining a first side of the first angle and
a mid-point of a third line extending at a second angle between the point of intersection and the second region line on a side of the second perpendicular line away from an origin point of the first angle,
a second line segment extending between
the mid-point of the third line and
a mid-point of a fourth line extending at a third angle between the mid-point of the third line to the second region line on a side of the third line away from the origin point of the first angle,
a third line segment extending between
the mid-point of the fourth line and a mid-point of a fifth line extending at a fourth angle between the mid-point of the fourth line to the second region line on a side of the fourth line away from the origin point of the first angle.

6. The flow-guiding component as claimed in claim 5, wherein
the second angle is 45°,
the third angle is 22.5°, and
the fourth angle is 12.25°.

7. The flow-guiding component as claimed in claim 6, wherein
the flow-guiding component is a tube angle fitting.

8. The flow-guiding component as claimed in claim 6, further comprising:
flow deflection elements arranged along at least a portion of the contour of line segments, the flow deflection elements being aligned with the flow between the inflowing direction and the outflowing direction.

9. The flow-guiding component as claimed in claim 6, wherein
the contour of the direction-changing surface on the second side of the first angle is asymmetrical to a contour of the flow-guiding component on the first side of the first angle.

10. The flow-guiding component as claimed in claim 5, wherein
the flow-guiding component is a tube angle fitting.

11. The flow-guiding component as claimed in claim 5, further comprising:
flow deflection elements arranged along at least a portion of the contour of line segments, the flow deflection elements being aligned with the flow between the inflowing direction and the outflowing direction.

12. The flow-guiding component as claimed in claim 5, wherein
the flow direction-changing surface includes a contour on the first side of the first angle symmetrical to the contour on the second side of the first angle.

\* \* \* \* \*